US010512121B2

(12) United States Patent
Venkatraman et al.

(10) Patent No.: US 10,512,121 B2
(45) Date of Patent: Dec. 17, 2019

(54) METHOD OF AND SYSTEM FOR PACKET GATEWAY AND CONTENT MANAGEMENT INTEGRATION

(71) Applicant: Affirmed Networks, Inc., Acton, MA (US)

(72) Inventors: Srinivasan Venkatraman, Belmont, MA (US); Anand Krishnamurthy, Acton, MA (US); Hassan Ahmed, Andover, MA (US); Paul Sherer, Danville, CA (US)

(73) Assignee: AFFIRMED NETWORKS, INC., Acton, MA (US)

(*) Notice: Subject to any disclaimer, the term of this patent is extended or adjusted under 35 U.S.C. 154(b) by 0 days.

(21) Appl. No.: 13/864,896

(22) Filed: Apr. 17, 2013

(65) Prior Publication Data

US 2013/0235800 A1 Sep. 12, 2013

Related U.S. Application Data

(63) Continuation-in-part of application No. 13/273,523, filed on Oct. 14, 2011, now abandoned.

(51) Int. Cl.
*H04W 88/16* (2009.01)

(52) U.S. Cl.
CPC ................ *H04W 88/16* (2013.01)

(58) Field of Classification Search
CPC ...................................... H04W 88/16
USPC ........................................ 370/328
See application file for complete search history.

(56) References Cited

U.S. PATENT DOCUMENTS

| | | | |
|---|---|---|---|
| 2009/0024698 A1* | 1/2009 | Ho | H04L 67/10 709/203 |
| 2011/0211465 A1* | 9/2011 | Farrugia et al. | 370/252 |
| 2011/0283011 A1* | 11/2011 | Li et al. | 709/231 |
| 2011/0299395 A1* | 12/2011 | Mariblanca Nieves | 370/235 |

* cited by examiner

*Primary Examiner* — Chuck Huynh
(74) *Attorney, Agent, or Firm* — Wilmer Cutler Pickering Hale and Dorr LLP

(57) ABSTRACT

Methods of and systems for packet gateway and content management integration are disclosed. An integrated gateway and content management module provides content to mobile user equipment from a content delivery network. The module operates on the content based on information about the mobile user equipment and/or network entities with which the mobile user equipment is communicating and information about the content being provided. The integrated gateway and content management module discovers said information.

9 Claims, 4 Drawing Sheets

METHOD OF AND SYSTEM FOR PACKET GATEWAY AND CONTENT MANAGEMENT INTEGRATION

CROSS-REFERENCE TO RELATED APPLICATIONS

This application is a continuation-in-part of and claims the benefit under 35 U.S.C. § 120 to U.S. patent application Ser. No. 13/273,523, filed Oct. 14, 2011, entitled Packet Gateway Integrated with Content Management for 3G and 4G Mobile Networks, which is incorporated by reference herein.

BACKGROUND OF THE INVENTION

The present invention pertains to wireless networks, and more particularly to a packet gateway integrated with content management for 3G and 4G mobile networks.

Packet gateways are switching systems that provide mobile termination call processing for circuit (e.g., time-division multiplexed) connections and packet (e.g., Internet Protocol—IP) connections. Packet gateways are sometimes referred to as gateway mobile switching centers (MSCs). Packet gateways are typically not connected to cell sites or base stations. Packet gateways are often used to coordinate telecommunications services for a service provider that has networks of different technologies. For example, a service provider arranges its networks such that all calls are directed to a packet gateway, rather than to a MSC for a particular technology. Because packet gateways are capable of communicating with MSCs and home location registers (HLRs) of multiple technologies, the packet gateway is effective in directing calls to the appropriate MSC and associated HLR, if necessary.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for integrated gateway and content management for mobile networks.

In an aspect, a network server includes a processor, a memory, a packet gateway module integrated with a content management module, the content management module including mobile subscriber information, and communication links to one or more of a mobile network operator's Online Charging System (OCS), an Offline Charging Subsystem (OFCS) and Policy Control and Charging Function (PCRF).

In another aspect, a network server includes a processor, a memory, a packet data network (PDN) gateway (PGW) module integrated with a content management module, the content management module including mobile subscriber information, and communication links to one or more of a mobile network operator's Online Charging System (OCS), an Offline Charging Subsystem (OFCS) and Policy Control and Charging Function (PCRF).

In another aspect, a network server includes a processor, a memory, a gateway general packet radio service (GPRS) support node (GGSN) module integrated with a content management module, the content management module including mobile subscriber information, and communication links to one or more of a mobile network operator's Online Charging System (OCS), an Offline Charging Subsystem (OFCS) and Policy Control and Charging Function (PCRF).

In another aspect, a network element includes a processor, a memory, and an integrated gateway and content management module. The module provides content to mobile user equipment from a content delivery network, and the module operates on the content based on information about the mobile user equipment and/or network entities with which the mobile user equipment is communicating and information about the content being provided. The integrated gateway and content management module discovers said information.

In another aspect, the network element also includes communication links to one or more of a mobile network operator's Online Charging System (OCS), an Offline Charging Subsystem (OFCS) and Policy Control and Charging Function (PCRF).

In another aspect, the integrated gateway and content management module receives input from at least one of the OCS, the OFCS and the PCRF.

In another aspect, the integrated gateway and content management module includes a PGW module used in LTE/4G networks that provides connectivity from the mobile user equipment to external packet data networks (PDNs) by being a point of exit and entry of traffic for the mobile user equipment.

In another aspect, the integrated gateway and content management module includes a gateway general packet radio service (GPRS) support node (GGSN) module responsible for interworking between a GPRS network and an external packet switched network.

In another aspect, the external packet switched network is as least one of the Internet and an X.25 network.

In another aspect, the integrated gateway and content management module comprises functions for storing and delivering content and services to mobile user equipment.

In another aspect, the mobile user equipment is selected from the group consisting of mobile phones, smart phones, and personal data assistants (PDAs).

In another aspect, the integrated gateway and content management module further comprises a content filtering module, a content caching module, a content adaptation module, an analytics module and a content optimization module.

Other features and advantages of the invention are apparent from the following description, and from the claims. Any of the above aspects can be combined with other aspects disclosed in the summary above and the description below.

BRIEF DESCRIPTION OF THE DRAWINGS

The invention will be more fully understood by reference to the detailed description, in conjunction with the following figures, wherein.

DETAILED DESCRIPTION

Figure 1:
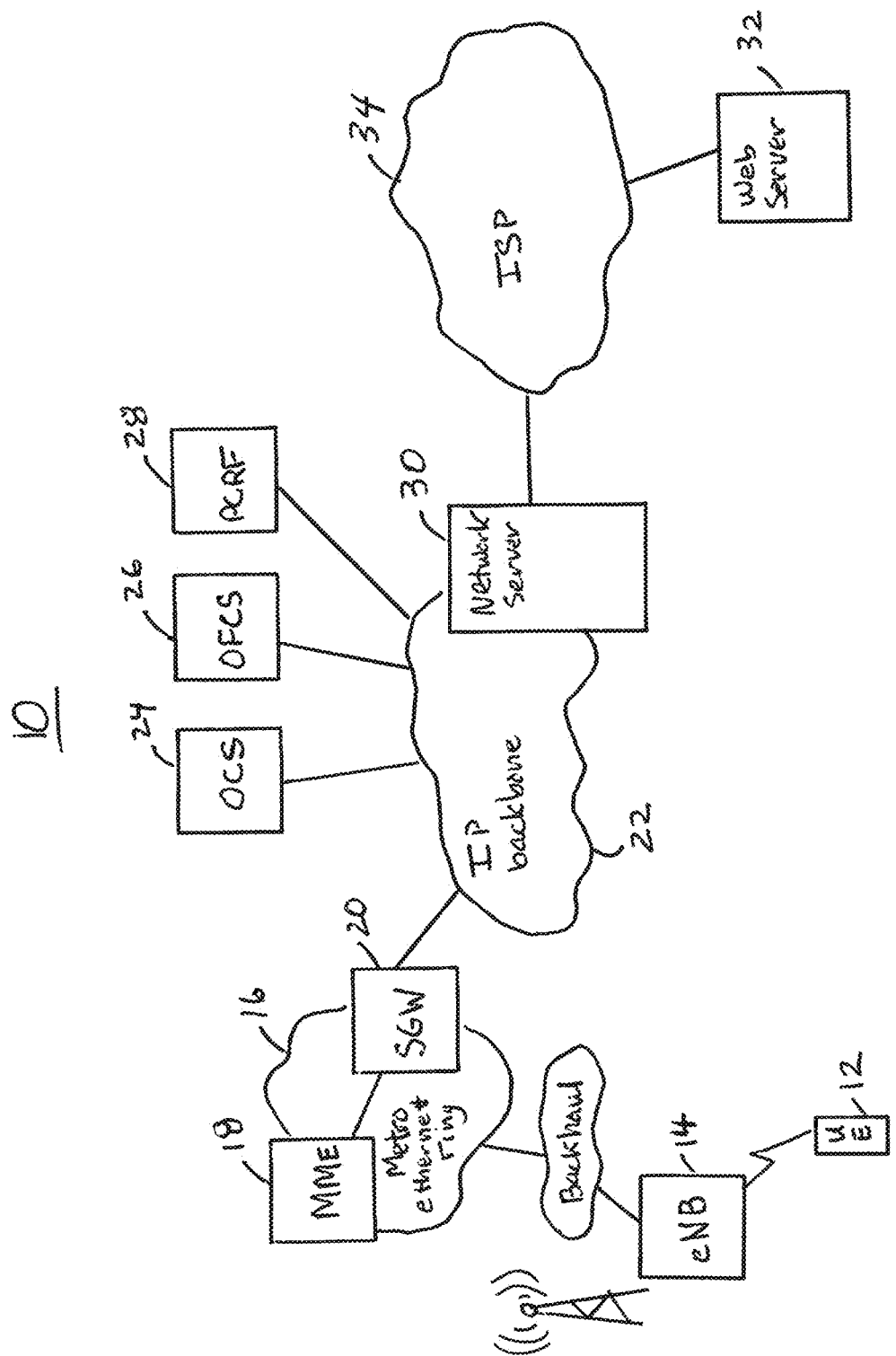
FIG. 1 is a block diagram of an exemplary mobile network.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, printer, tablet, Wi-Fi Hotspot and so forth) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

Content management (e.g., proxy, caching, content manipulation) for wireless networks is typically done behind the Gi interface in a mobile 3G/4G network. The Gi interface is an Internet Protocol (IP) based interface between a Gateway General Packet Radio Service (GPRS) Support Node (GGSN) and a public data network (PDN) either directly to the Internet or through a Wireless Access Point (WAP) gateway. Solutions in existing wireless operator networks, such as AT&T and Verizon, suffer from a significant drawback, i.e., content management and subscriber management are done in different nodes in the network and have little interaction. This leads to inefficiencies and lack of flexibility in controlling a user Quality of Experience (QoE). The present invention addresses these drawbacks by integrating content management with the PDN Gateway (4G) or GGSN (3G).

The drawbacks of existing non-integrated network include a lack of subscriber knowledge outside the Packet Gateway (PGW/GGSN), a lack of the ability to configure packet treatment based on subscriber behavior, and a lack of a feedback mechanism.

Regarding the lack of subscriber knowledge outside the Packet Gateway (PGW/GGSN), operators typically implement solutions where the subscriber ID (e.g., IMEI) is embedded into the packet (e.g., HTTP header) and the content management node fetches the subscriber information through the standard interfaces, e.g., PCRF, Authentication, Authorization, and Accounting (AAA), Remote Authentication Dial In User Service (RADIUS). This is an additional query that leads to latency and inefficiency.

Regarding the lack of the ability to configure packet treatment based on subscriber behavior, a non-integrated solution doesn't dynamically adapt a treatment of packet flows based on analytics collected for a subscriber.

Regarding the lack of a feedback mechanism, a non-integrated solution does not provide any feedback to the gateway function and does not allow the gateway to take additional actions (e.g., traffic management).

As shown in FIG. 1, a mobile network 10 includes user equipment (UE) 12, such as a smart phone. Other examples of US 12 include, but are not limited to, cellular phone, computer, personal digital assistant (PDA), set-top box, Internet Protocol Television (IPTV), electronic gaming device, printer, tablet, Wi-Fi Hotspot and so forth. The UE 12 is wirelessly linked to an Evolved Node B (eNB) 14. The eNB 14 is a radio part of a cell site. A single eNB may contain several radio transmitters, receivers, control sections and power supplies. The eNB 14 is backhauled to a metro Ethernet ring 16, which includes a Mobility Management Entity (MME) 18 and a Serving Gateway (SGW) 20. Backhaul is a process of transferring packets or communication signals over relatively long distances to a separate location for processing. The SGW 20 routes and forwards user data packets, while also acting as the mobility anchor for a user plane during inter-eNodeB handovers.

The SGW 20 is linked to an Internet Protocol (IP) backbone 22. The IP backbone 22 includes links to an Online Charging System (OCS) 24, an Offline Charging Subsystem (OFCS) 26 and a Policy Control and Charging Function (PCRF) 28. In general, the OCS 24 is a set of interconnected network elements that enable the identification, rating and posting of charges in real time (or near real time). The OFCS 26 receives charging data in the form of Call Detail Records (CDRs) and Diameter accounting messages from network elements after the subscriber incurs network resource usage.

The IP backbone 22 includes a network server 30 that implements a packet gateway integrated with content management for 3G and 4G mobile networks. The network server 30 is linked to a web server 32 through an Internet Service Provider (ISP) 34.

Figure 2:
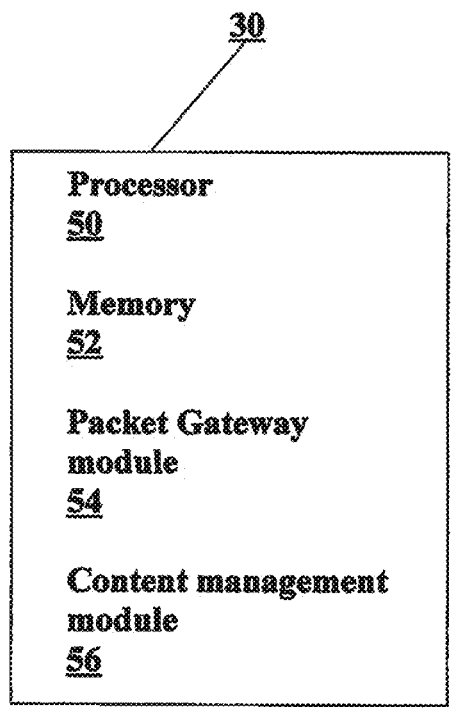
FIG. 2 is a block diagram of an exemplary network server.

As shown in FIG. 2, the network server 30 includes a processor 50, memory 52, PDN Gateway (PGW) module 54 and content management module 56. The PGW module 54 is a gateway used in LTE/4G networks that provides connectivity from the UE 12 to external packet data networks (PDNs) by being a point of exit and entry of traffic for the UE 12. The content management module 56 is a content management system (CMS) capable of storing and delivering content and services to UE 12, such as mobile phones, smart phones, and PDAs. Integration of the PGW module 54 and content management module 56 enables an integrated subscriber management and content management function. In particular, mobile subscriber information is readily available along with numerous content management functions included in the content management module 56, such as content filtering, content caching, content adaptation, analytics, content optimization, and so forth.

Figure 3:
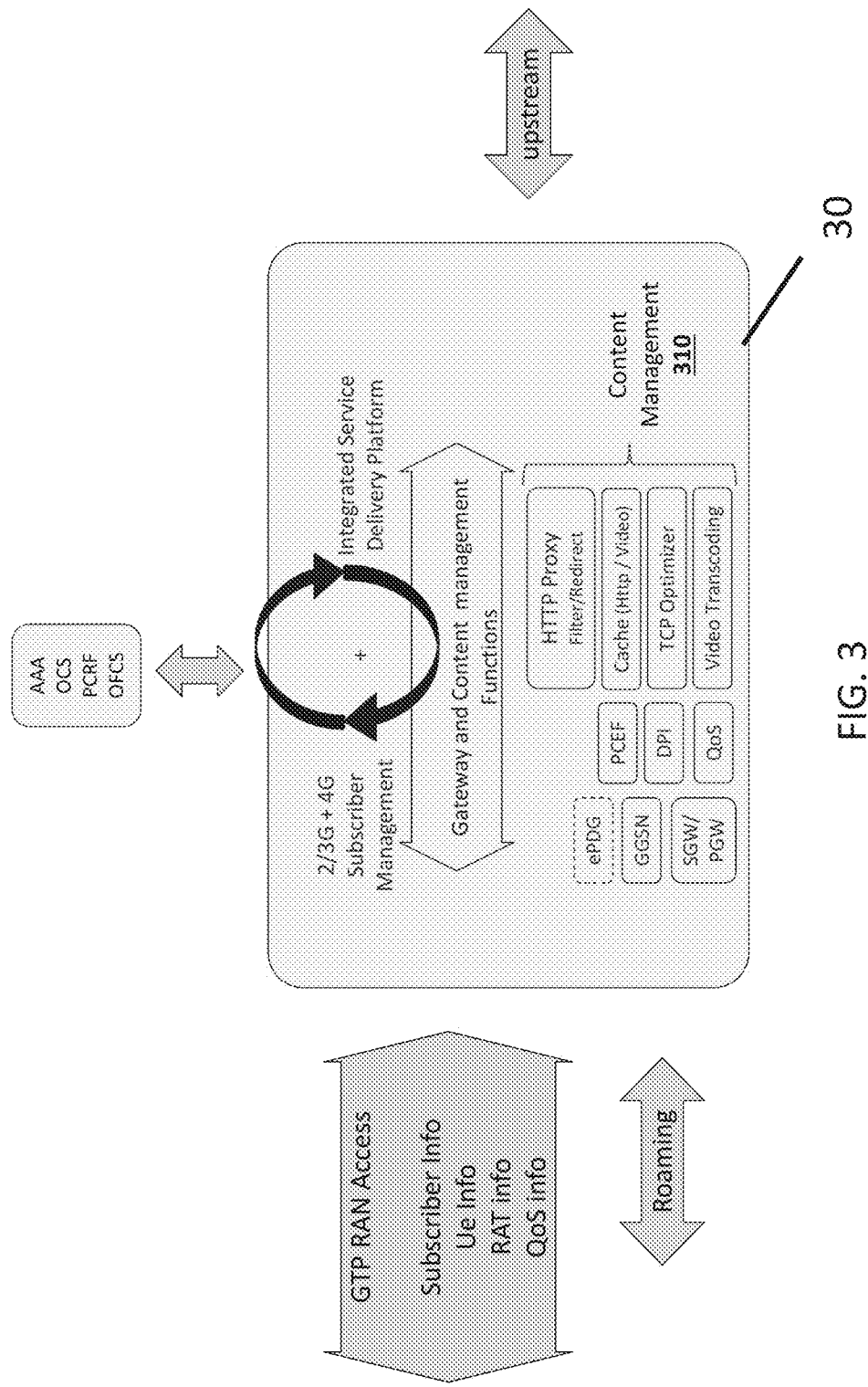
FIG. 3 illustrates an implementation of an integrated network server.

FIG. 3 illustrates an implementation of the network server 30. As described above, the network server 30 has packet gateway functionality and content management functionality that has been integrated. As used herein in connection with the packet gateway and content management functionalities, "integrated" describes two sets of functions that operate in a shared environment rather than the traditional de-composed gateway and service-optimization approach. Thus, rather than being in different network elements, the packet gateway and content management modules are within a single element and/or a single platform. Thus, rather than existing as separate modules, the packet gateway functionality and content management functionality are combined and exist in a single module. In some implementations, the functions performed by the merged module is within the same set of instructions. In other implementations, the cooperating modules are managed by a set of instructions such that information is easily shared between the cooperating modules without the need for external communication interfaces, the use of communication standards, and/or the need to include extra information in the headers of messages between modules. In this way, the cooperating modules act as a merged module when operating with the information provided by the packet gateway functionality and content management functionality.

The integrated modules or single enhanced module can be implemented in one or many physical devices (e.g., in one or many servers and/or one or many server racks). Thus, describing the functionalities of the packet gateway and content management functionality/modules as integrated does not require the instruction sets to be contained within a single piece of hardware. Rather, integration describes the operation and data sharing ability of the packet gateway and content management modules described herein. As shown in FIG. 3, the integrated functionalities in the network server enable content management functions 310—such as, HTTP proxy functions (e.g., filtering and redirection), HTTP/video caching, TCP optimization, and/or video transcoding—to take place in the integrated solution.

The disclosed techniques stand in contrast to known deployments in which the content management functions are implemented by different network elements, each having a proprietary interface to an AAA network (e.g., via RADIUS feeds) to get the subscriber information. When integrated with packet gateway, these attributes are shared by the packet gateway function and the content management functions in the same platform (i.e., the network server 30) and are readily available for content functions. Integrating content management with the packet gateway also provides access to all the subscriber and radio network related information available at the packet gateway, which known deployments lack.

For example, traditionally, when a user on UE 12 requests a broadcast application, such as a sporting event, from the web server 32, the application knows nothing about the subscriber and the subscriber knows nothing about the application. Using the network server 30, integration of the PGW module 54 and content management module 56 enable a higher Quality of Service (QoS) because subscriber information, such as a form factor of the UE 12, is known, as well as charging information from the OCS 24, the OFCS 26 and the PCRF 28, and thus delivery of the content from the web server 32 can be adapted and or customized to the specific UE 12.

The packet gateway module 54 of the network server 30 has an interface to the OCS, OFCS, and PCRF. Because the charging and policy enforcement is primarily on the packet gateway in known systems, implementation of any charging and quality of service enforcement based on content management functions is very difficult to achieve (e.g., reconciliation of records from packet gateway and content management functions). Integrating these modules according to the techniques disclosed herein provides the ability to consolidate and enforce based on policies associated with content management functions.

The configuration of the network server 30 described above is suitable for a 4G network yet may be adapted to other network types. For example, in 2G, 3G and WCDMA mobile networks, the PGW module 54 is replaced with a Gateway GPRS Support Node (GGSN) module. In such an adaptation, the GGSN module is responsible for the interworking between a General Packet Radio Service (GPRS) network and external packet switched networks, like the Internet and X.25 networks.

In one implementation of the invention, the packet gateway module 54 of the network server 30 performs packet inspection, connection termination, and policy evaluation on the packets flowing through the network server 30 using the content management module 56. By performing these actions in the network server 30 (in contrast to a series of nodes), a more efficient use of available CPU resources and lower overall packet processing latency is realized. Moreover, as the bandwidth in use increases with 3G and 4G technologies, the latency reduction offered by such implementations improves the user experience when, e.g., downloading or browsing different types of content. Thus, having an integrated packet gateway in the network server 30, reduces the packet latency by, e.g., reducing the number of "hops" in the network.

The network server 30 also enables traffic steering and identification of the set of content services to be applied for based on a specific subscriber under specific network conditions by making the information needed (e.g., subscriber related information such as profile, mobile parameters, such as IMSI and MSISDN, and network information, such as the serving gateway or the cell ID) readily available for the decision making entity, i.e., the integrated packet gateway module 54 and content management module 56. Integrating content management functions with the packet gateway provides information to efficiently steer traffic to the right network based on the content accessed for specific set of subscribers.

Figure 4:
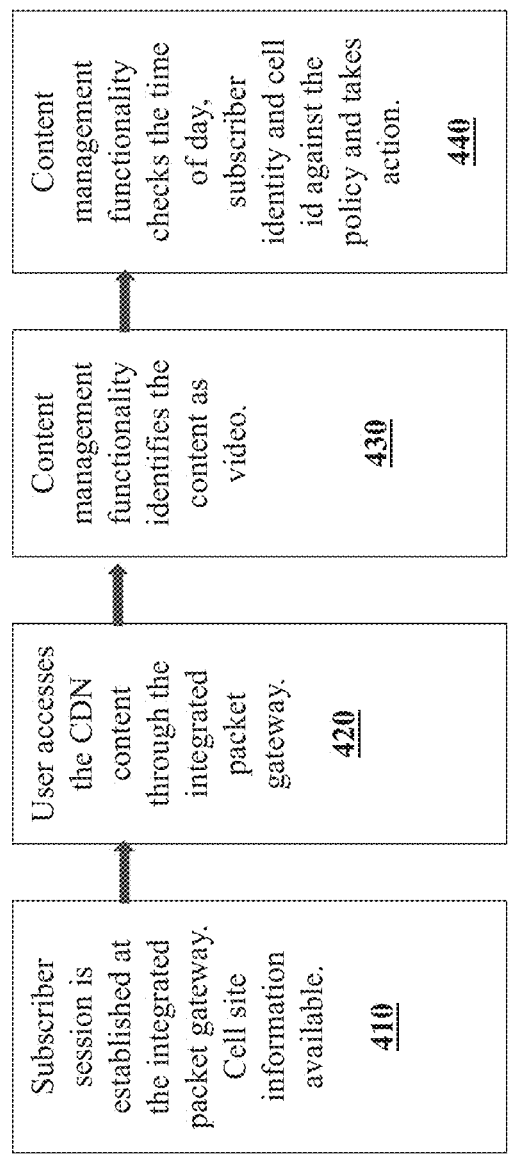
FIG. 4 illustrates an implementation of an integrated network server.

FIG. 4 illustrates an implementation 400 of the integrated network server 30. Assume an operator wants to grant a certain set of subscribers (e.g., enterprise customers) access to a set of videos from the video content delivery network (CDN) during only certain hours of the day and only from specific cell sites. Implementations of the network server 30 having the packet gateway functionality integrated with the content management functionality enables this without additional expensive and inefficient ways of implementing in the network. A subscriber session is established at the packet gateway portion of the combined module by the user's request 410. Cell site information is available to the packet gateway portion. The user requests access to the CDN content through the packet gateway 420. The integrated content management functionality identifies the content as video, which is subject to the operator's policy described above, 430. The content management functionality checks the time of day, subscriber identity, and cell site id against the policy and takes appropriate action (e.g., either permits or denies access) 440. Because the packet gateway and content management functionality are integrated in the network server 30, all of the needed information (cell id, subscriber id, policy information, etc.) is available in one network element. Thus, the policy is implemented without the need for, e.g., time-consuming queries outside of the network element.

In still further implementations, the network server 30 provides the ability to apply sophisticated charging policies and plans for the subscriber. Because online charging requires that credits be applied dynamically based on policy evaluation, the integrated packet gateway and content management modules reduce the relatively high latency seen in known architectures. For example, assume an operator wants to charge a higher rate for certain subscribers while providing a better quality of experience to those same subscribers. In known systems, this is practically very difficult to do because the PCEF (Policy and Charging Enforcement Function—responsible for Charging and QoS) is in a different network element and video optimization is done at a different node. The network server 30 combines these elements and provides the ability to implement QoS and Charging based on the dynamic decisions and bitrate modifications done by the optimization service in the content management module 56. This enables the system to control the quality of service parameters and the bitrate adaptation of the videos from, e.g., top video sites.

Another issue with known deployment models is the lack of an efficient method to get congestion information from the network for making content optimization decisions. As described herein, packet gateway module 54 obtains information from control elements (external feeds) or inline user plane congestion information. When combined with the subscriber profile information contained in the content management module 56, the packet gateway module 54 applies different content optimization techniques based on the congestion state of the subscriber or the network (cell). This improves over the known networks because in known deployments, needed information is not readily available. For example, the subscriber's anchoring cell or whether the subscriber is roaming or not may not be known. Moreover, the congestion state can only be used with the network and subscriber information.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A network element comprising:
a processor;
a memory; and
an integrated gateway and content management module for providing user-requested content to mobile user equipment from a content delivery network, the user-requested content being associated with content a mobile user downloads or browses on the content delivery network, the integrated gateway and content management module customizing the user-requested content based on (a) information about the mobile user equipment and network entities with which the mobile user equipment is communicating and (b) information about a type of the user-requested content being provided, wherein the integrated gateway and content management module discovers said information, wherein the information about the mobile user equipment includes a form factor of the mobile user equipment.

2. The network element of claim 1, further comprising communication links to one or more of a mobile network operator's Online Charging System (OCS), an Offline Charging Subsystem (OFCS) and Policy Control and Charging Function (PCRF).

3. The network element of claim 2 wherein the integrated gateway and content management module receives input from at least one of the OCS, the OFCS and the PCRF.

4. The network element of claim 1, wherein the integrated gateway and content management module includes a PGW module used in LTE/4G networks that provides connectivity from the mobile user equipment to external packet data networks (PDNs) by being a point of exit and entry of traffic for the mobile user equipment.

5. The network element of claim 1, wherein the integrated gateway and content management module includes a gateway general packet radio service (GPRS) support node (GGSN) module responsible for interworking between a GPRS network and an external packet switched network.

6. The network element of claim 5, wherein the external packet switched network is as least one of the Internet and an X.25 network.

7. The network element of claim 1, wherein the integrated gateway and content management module comprises functions for storing and delivering content and services to mobile user equipment.

8. The network element of claim 7, wherein the mobile user equipment is selected from the group consisting of mobile phones, smart phones, and personal data assistants (PDAs).

9. The network element of claim 7, wherein the integrated gateway and content management module further comprises a content filtering module, a content caching module, a content adaptation module, an analytics module and a content optimization module.

* * * * *